US011326647B1

(12) United States Patent
Bohme (10) Patent No.: US 11,326,647 B1
(45) Date of Patent: May 10, 2022

(54) APPARATUS AND METHOD FOR REMOVAL OF A MAIN SHAFT BEARING FROM A GATE CROSSING MECHANISM USING A BEARING REMOVAL TOOL

(71) Applicant: Siemens Mobility, Inc., New York, NY (US)

(72) Inventor: Richard C. Bohme, Louisville, KY (US)

(73) Assignee: Siemens Mobility, Inc., New York, NY (US)

( * ) Notice: Subject to any disclaimer, the term of this patent is extended or adjusted under 35 U.S.C. 154(b) by 0 days.

(21) Appl. No.: 17/246,110

(22) Filed: Apr. 30, 2021

(51) Int. Cl.
*B23P 19/00* (2006.01)
*F16C 43/02* (2006.01)
*B25B 27/06* (2006.01)
*B61L 29/04* (2006.01)
*B23P 19/04* (2006.01)
*B23P 11/00* (2006.01)

(52) U.S. Cl.
CPC ............ *F16C 43/02* (2013.01); *B25B 27/062* (2013.01); *B23P 11/00* (2013.01); *B23P 11/005* (2013.01); *B23P 19/04* (2013.01); *B61L 29/04* (2013.01); *Y10T 29/53796* (2015.01)

(58) Field of Classification Search
CPC ........ B23P 11/00; B23P 19/04; B25B 27/062; B25B 27/00
See application file for complete search history.

(56) References Cited

U.S. PATENT DOCUMENTS

| | | | |
|---|---|---|---|
| 4,034,458 A * | 7/1977 | Ford | B25B 27/062 29/259 |
| 7,690,702 B2 | 4/2010 | Bohme | |
| 7,996,972 B2 * | 8/2011 | Hu | B25B 27/064 29/252 |
| 9,272,721 B2 | 3/2016 | Bohme | |
| 9,486,902 B1 * | 11/2016 | Miller | B25B 27/023 |
| 2013/0152353 A1 * | 6/2013 | Hu | B25B 27/023 29/261 |
| 2021/0001908 A1 | 1/2021 | Bohme | |

* cited by examiner

*Primary Examiner* — Lee D Wilson (57) ABSTRACT

There are disclosed apparatuses and methods for removal of a shaft bearing from a gate crossing mechanism. A bearing support includes support apertures and is positioned about the shaft bearing. A bearing ring includes ring apertures. A bearing tool includes keys in which each key has a shape allowing insertion through a ring aperture and a support aperture. The bearing tool shifts each key inward toward the shaft bearing. The bearing ring is rotated in a circular direction relative to the keys. The bearing tool withdraws the shaft bearing from the bearing support.

8 Claims, 10 Drawing Sheets

APPARATUS AND METHOD FOR REMOVAL OF A MAIN SHAFT BEARING FROM A GATE CROSSING MECHANISM USING A BEARING REMOVAL TOOL

FIELD OF THE INVENTION

This application relates to the field of gate control systems at railroad/highway crossings and, more particularly, to a gate crossing mechanism having a replaceable main shaft bearings.

BACKGROUND

Main shaft bearings of conventional highway crossing gates are near impossible to remove without total disassembly of gate mechanisms of the crossing gates. Changes to a main shaft bearing require many external parts of the gate mechanism need to be removed from the main shaft. In addition, replacement of a main shaft bearing requires removal of a corresponding main shaft and complete disturbance of internal components as well as field adjustments for the location. Electrical components and mechanical assemblies are disconnected and removed in order to gain access other parts of the gate mechanism. Sometimes, the use of a torch or hammer is needed to shift or otherwise move mechanical parts in order to allow removal of the main shaft bearing. Hand clearance may also be necessary in order to reach inside the housing of the gate mechanism for various reasons, such as manually pushing the bearing out of the housing. Once the main shaft bearing is replaced, the whole disassembly process is reversed with special care to reassemble the internal and external parts of the crossing gate. Further, functional testing and adjusting are required before placing the crossing gate back in service.

Accordingly, main shaft bearings of conventional highway crossing gates are difficult to replace in the field. Much disassembly is required, and a substantial amount of time is necessary to reassemble and make internal adjustments to vital operation parts.

SUMMARY

In accordance with one embodiment of the disclosure, there is provided an approach for replacement of a main shaft bearing of a crossing mechanism without the need to remove the main shaft from the mechanism, thus leaving most or all internal components and settings in place. The housing is specially designed, particularly a bearing support and a bearing plate, such that a specific bearing removal tool may be used for bearing replacement. The housing and bearing tool save a great deal of time, particularly where a main shaft bearing needs to be serviced in the field. Shaft bearings may wear over time but also see shock damage from vehicles hitting the gate arm. Advantages of the approach include time savings, risk reduction, minimal adjustment of cams, minimal movement of vital components on the shaft, and serviceability even if the segment gear is frozen on the shaft.

One aspect is a method of a bearing tool for removal of a shaft bearing from a bearing support of a gate crossing mechanism. The bearing tool includes multiple keys, and the bearing support is positioned about the shaft bearing. The keys insert through ring apertures of a bearing ring and support apertures of the bearing support. Each key shifts inward toward the shaft bearing. The bearing ring rotates in a circular direction relative to the keys. The shaft bearing is withdrawn from the bearing support.

Another aspect is an apparatus for removal of a shaft bearing from a gate crossing mechanism. The apparatus comprises a bearing support of the gate crossing mechanism, a bearing ring of the gate crossing mechanism, and a bearing tool. The bearing support is positioned about the shaft bearing, and the bearing support includes multiple support apertures. The bearing ring includes multiple ring apertures. The bearing tool includes multiple keys, and each key has a shape allowing insertion through a ring aperture of the ring apertures and a support aperture of the support apertures. The bearing tool shifts each key inward toward the shaft bearing. The bearing ring is rotated in a circular direction relative to the keys. The bearing tool withdraws the shaft bearing from the bearing support.

Yet another aspect is a bearing tool for removal of a shaft bearing from a bearing support of a gate crossing mechanism. The bearing tool comprises a base and a bearing jaw. The base includes a hub portion and a jaw support. The hub portion is configured to connect to a shaft associated with the shaft bearing. A bearing jaw connects to the jaw support and includes threaded rods, devises attached to the threaded rods, and keys attached to the devises. The threaded rods provide a first degree of movement in which each key of the plurality of keys pivots relative to the jaw support. The devises provide a second degree of movement different from the first degree of movement in which the keys shift inward relative to the jaw support.

The above described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

DETAILED DESCRIPTION

Various technologies that pertain to systems and methods that facilitate replacement of a main shaft bearing of a crossing mechanism, without the need to remove the main shaft from the crossing mechanism, will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Figure 1:
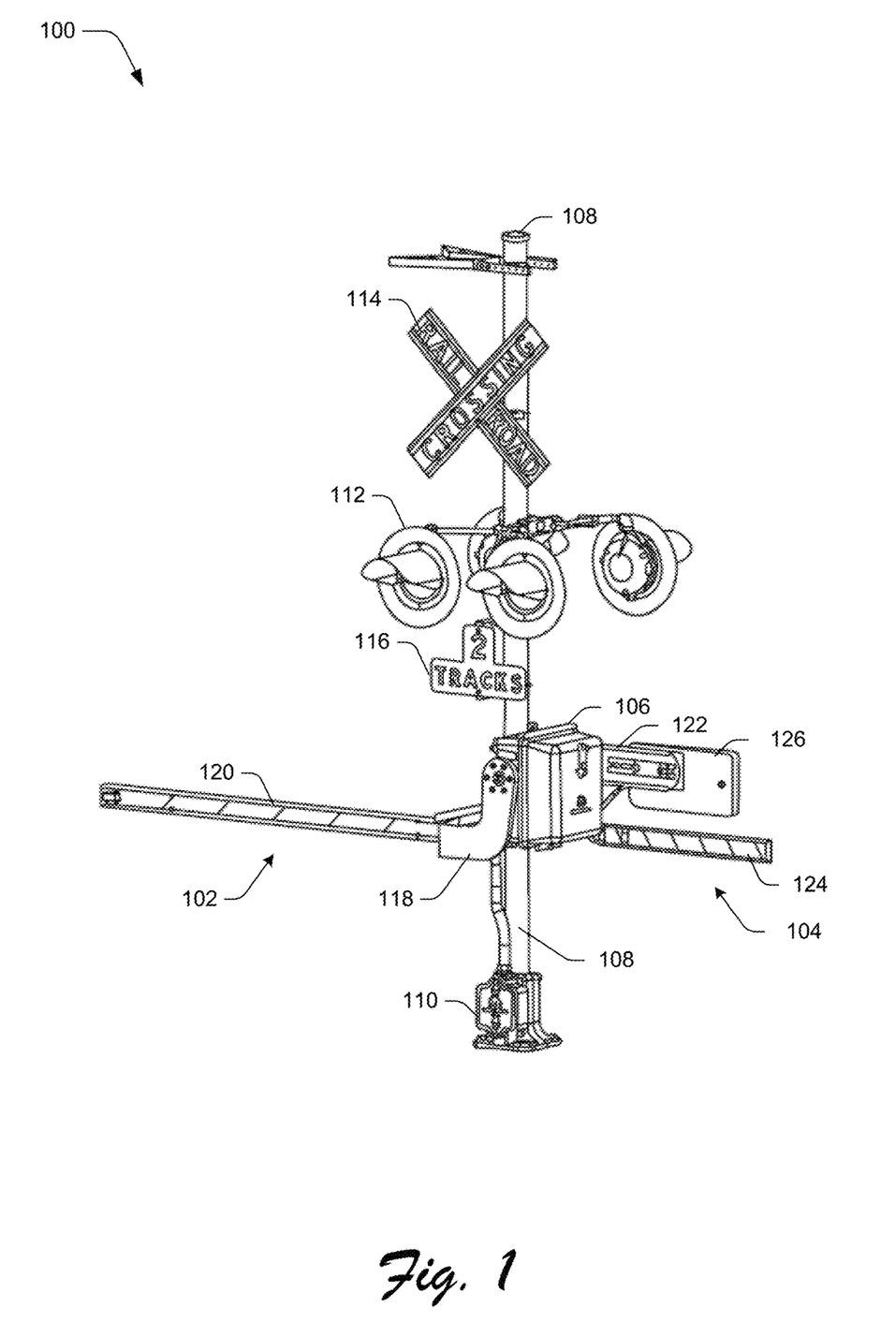
FIG. 1 illustrates of an environment, having a railroad crossing gate, in an example implementation that is operable to employ techniques described herein.

FIG. 1 illustrates of an environment in an example implementation that is operable to employ techniques described herein. In particular, a railroad crossing gate 100 shown in a lowered or substantially horizontal position. At many railroad crossings, at least one railroad crossing gate 100 may be placed on either side of the railroad track to restrict roadway traffic in both directions. At some crossings, pedestrian paths or sidewalks may run parallel to the roadway. To restrict road and sidewalk traffic, the illustrated railroad crossing gate 100 includes a separate roadway gate 102 and pedestrian gate 104. The roadway gate 102 and pedestrian gate 104 may be raised and lowered by a gate mechanism 106. The gate mechanism 106 provides efficiency and versatility to the operation of the railroad crossing gate 100, including entrance and/or exit gate configuration options. The gate mechanism 106 may be an integral part of a Wayside Information System (WIS) and Wayside Alarm Management System (WAMS) and report data back to an event recorder located along a wayside associated with such systems.

The example railroad crossing gate 100 also includes a pole or mast 108 supported at its base by a foundation or ground surface. The mast 108 supports a junction box 110 to provide electrical and electronic connections for the gate mechanism 106 and other electrical/electronic components of the crossing gate 100, such as flashing signal lights. The mast 108 may further support one or more mechanical components such as a railroad crossing sign 114 and/or a track sign 116. The gate mechanism 106 is attached to the mast 108 and is used to raise and lower the roadway and/or pedestrian gates 102, 104. The illustrated railroad crossing gate 100 is often referred to as a combined crossing gate. When a rail vehicle approaches the crossing, the railroad crossing gate 100 may provide a visual warning using the signal lights 112, railroad crossing sign 114, and/or track sign 116. The gate mechanism 106 will lower the roadway gate 102 and the pedestrian gate 104 to respectively restrict traffic and pedestrians from crossing the track until the rail vehicle has passed.

As shown in FIG. 1, the roadway gate 102 comprises a short counterweight support arm 118 that attaches a roadway gate arm 120 to the gate mechanism 106. Similarly, the pedestrian gate 104 comprises a pedestrian gate arm 124 connected to the gate mechanism 106. One or more counterweights 126 may be attached to a long counterweight support arm 122, opposite the short counterweight support arm 118, to counterbalance the weight structure of the roadway gate arm 120. When raised, the roadway and pedestrian gates 102, 104 are positioned so that they do not interfere with either roadway or pedestrian traffic. This position is often referred to as the vertical position, which is not necessarily exactly vertical relative to the ground. A "power-on" braking mechanism or other powered holding device (internal to the gate mechanism 106) is used to hold the gates 102, 104 when they are in the substantially vertical position. The roadway and pedestrian gates 102, 104 are raised and lowered between the substantially horizontal and vertical positions by the gate mechanism 106, 200.

Figure 2:
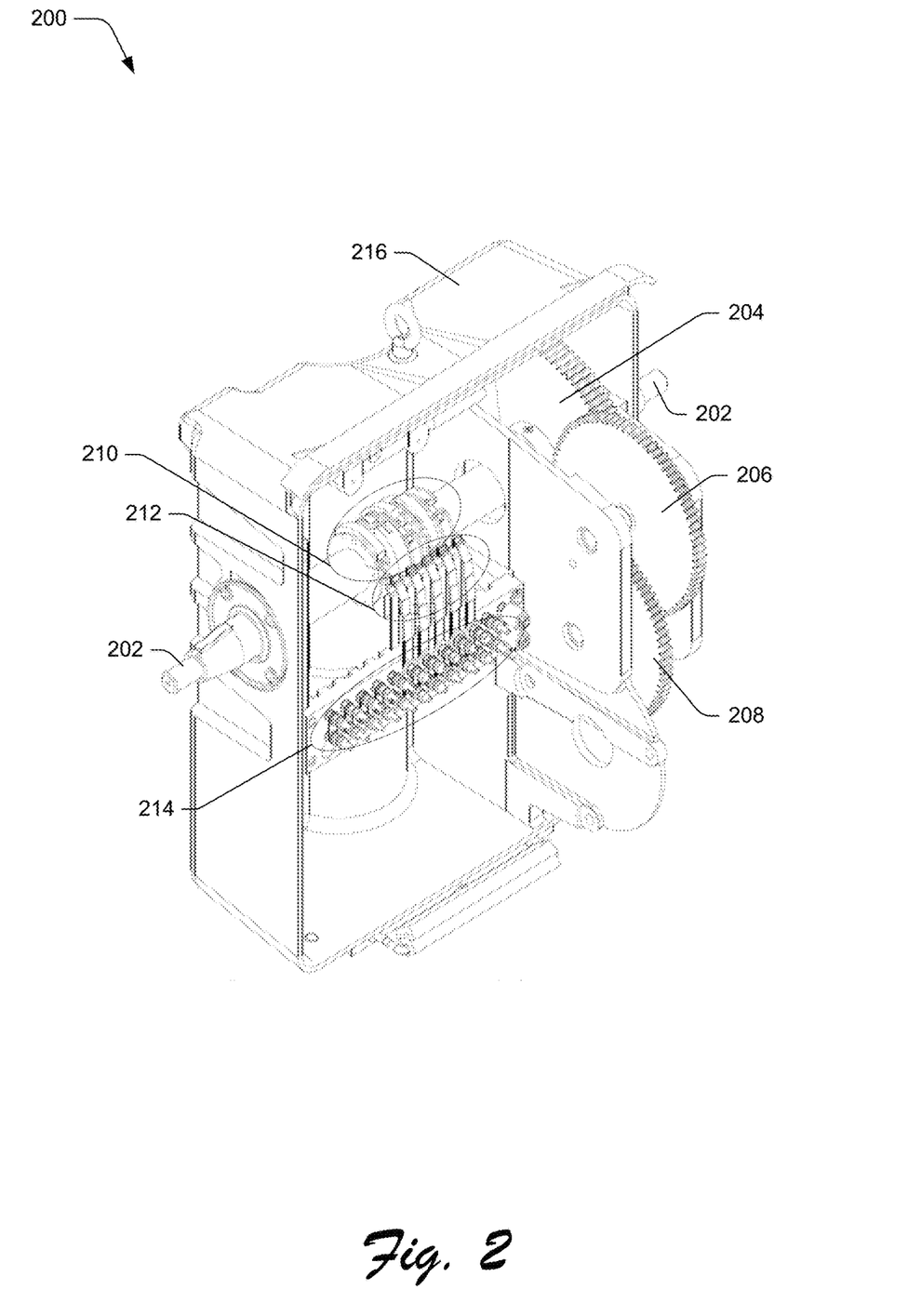
FIG. 2 is a partial perspective view of the gate mechanism of FIG. 1 in an example implementation that is operable to employ the techniques described herein.

Referring to FIG. 2, the gate mechanism 200 includes a main shaft 202 connected to the roadway gate arm 120 via the short counterweight support arm 118 and, for some embodiments, connected to the pedestrian gate 104 as well. The gate mechanism 200 further includes various electrical and mechanical components to drive and control the main shaft 202, such as a segment gear 204 coupled to the main shaft, upper and lower gears and pinions 206, 208 operating in conjunction with the segment gear 204, main shaft cams 210 coupled to the main shaft away from the segment gear, main shaft contacts 212 responsive to position and/or movement of the main shaft and the main shaft cams, and a terminal board assembly 214 for connections with other devices. The interaction of these components are important to the operation of the railroad crossing gate 100. For example, the main shaft cams 210 are positioned on the main shaft 202 such that they open and close main shaft contacts 212 at various angles of the main shaft and corresponding gate arm(s) 120, 124. Other components of the gate mechanism 200 include a motor assembly to drive the gearing 204, 206, 208, stop bar, defroster, upper and lower buffer assembly, and electrical/electronic control circuits, and various electrical wiring, which are not shown in FIG. 2 to facilitate an understanding of the general operation of the main shaft 202. A housing 216 of the gate mechanism 200 supports the components of the gate mechanism and provides protection for at least some components from elements external to the gate mechanism.

Figure 3A:
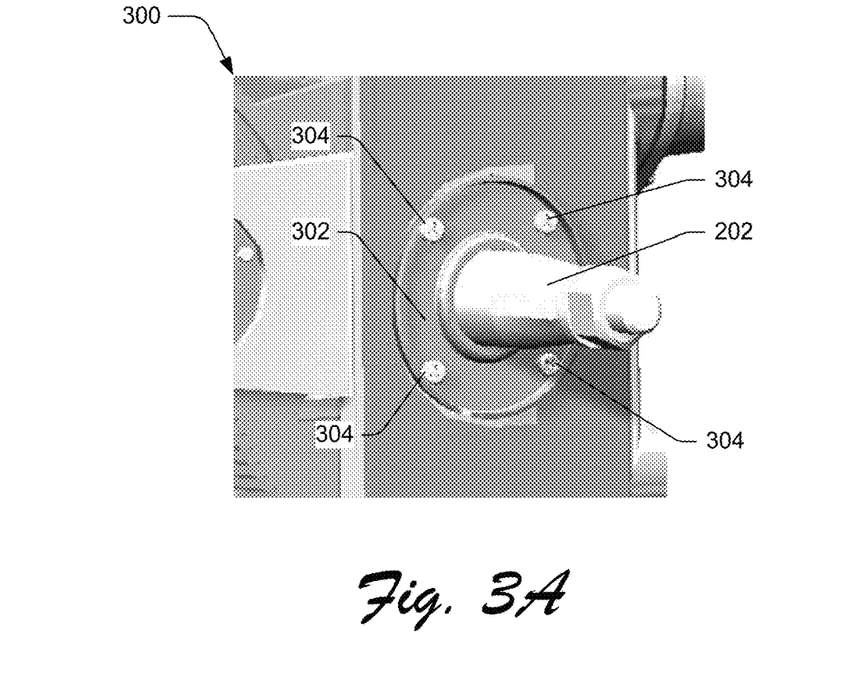
FIGS. 3A and 3B are side perspective views of an end portion of the main shaft of FIG. 2, and its associated components, in example implementations.

Referring to FIG. 3A, there is shown an end portion 300 of the main shaft 202 and its associated components. The external parts of the gate mechanism 200 are displaced to expose inner components adjacent to the end portion 300 of the main shaft 200. The external parts of the gate mechanism 200 include a bearing cover 302 and fasteners 304. The external parts may also include other components to facilitate the operation, and otherwise support, the main shaft 200 and/or its associated components, such as an O-ring and seal plate gasket (not shown), which are also displaced from the area around the main shaft 202.

Figure 3B:
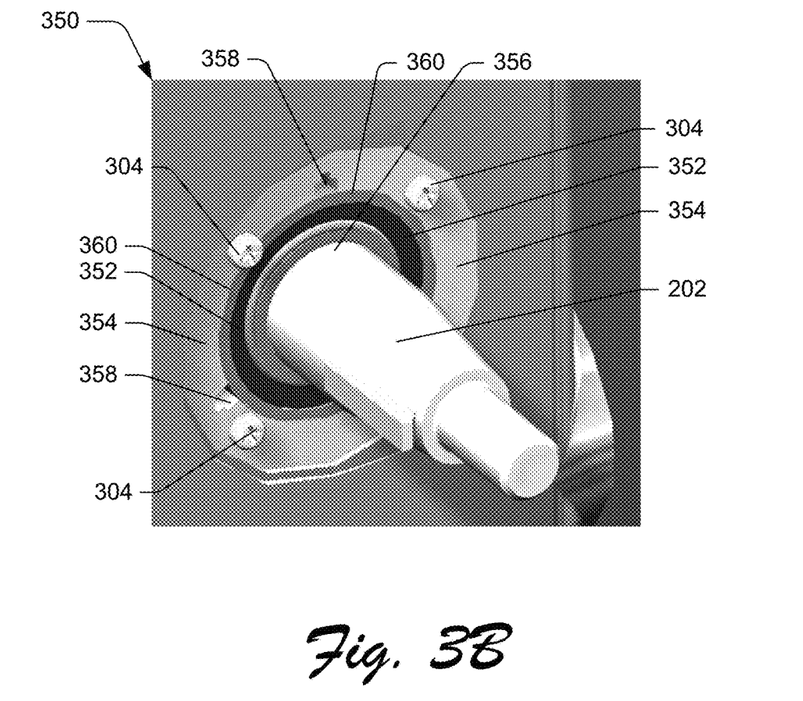

Referring to FIG. 3B, there is shown the end portion 350 of the main shaft 202 and its associated components, without the external parts shown in FIG. 3A. By displacing the external parts of the gate mechanism 200, the shaft bearing 352, a bearing support 354, and a further part 356 of the main shaft 200 are exposed. Removal of the external parts of the gate mechanism 200 also exposes machined features or support apertures 358 of the bearing support 354 around an outer diameter 360, or dimensions, of the shaft bearing 352. After removal of the external parts, the fasteners 304 may be reattached to the bearing support 354 of the crossing mechanism housing after installing a locking ring (such as the bearing ring 406 described below in reference to FIG. 4).

The apparatus for removal of a shaft bearing 352 may include a fastener management tool that exposes the bearing support 354 about the shaft bearing 352. The fastener management tool may be a part of, or separate from, the bearing tool described below in reference to FIGS. 4A & 4B. The fastener management tool removes the fasteners 304 from the bearing support 354 of the housing portion as well as the bearing cover 302 adjacent to the bearing support. The bearing cover 302 may then be displaced from the housing portion, and the fasteners 304 may be reattached to the bearing support 354. It is to be noted that the shaft bearing 352 may be slip fit on a shaft, such as the main shaft 202, into the housing of the gate mechanism 200, but the shaft bearing is difficult to pull out from the outside of the housing.

The apparatus for removal of a shaft bearing 352 reduces the labor and risk due to adjusting vital components and may be used for bearing replacement as needed. No internal parts of the gate mechanism 200 need to be removed, and the shaft does not need to be moved in order to expose the shaft bearing 352.

Figure 4A:
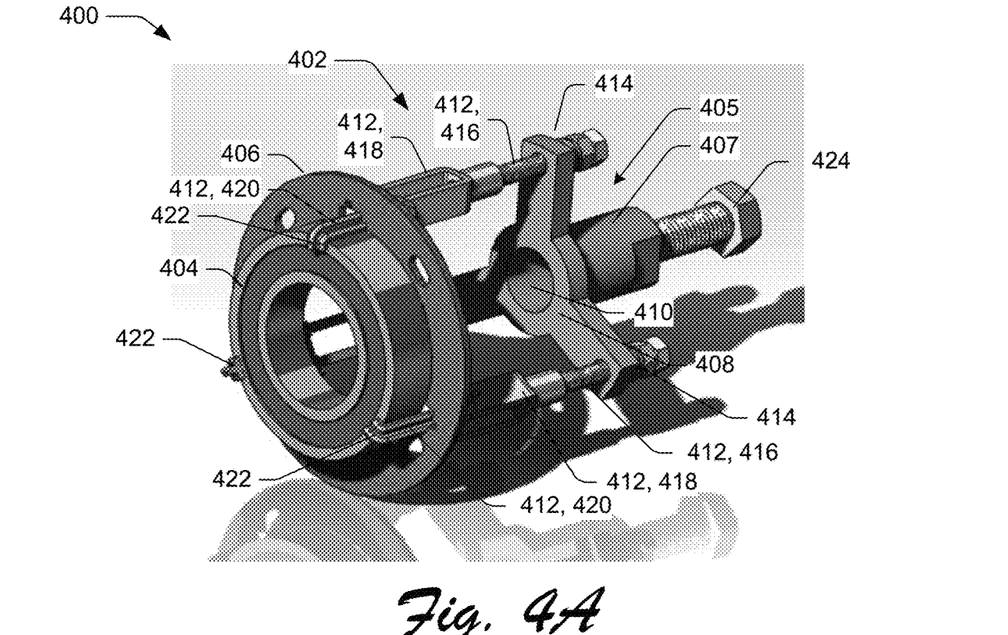
FIGS. 4A and 4B are perspective views of a bearing tool that is operable to employ the techniques described herein.
Figure 4B:
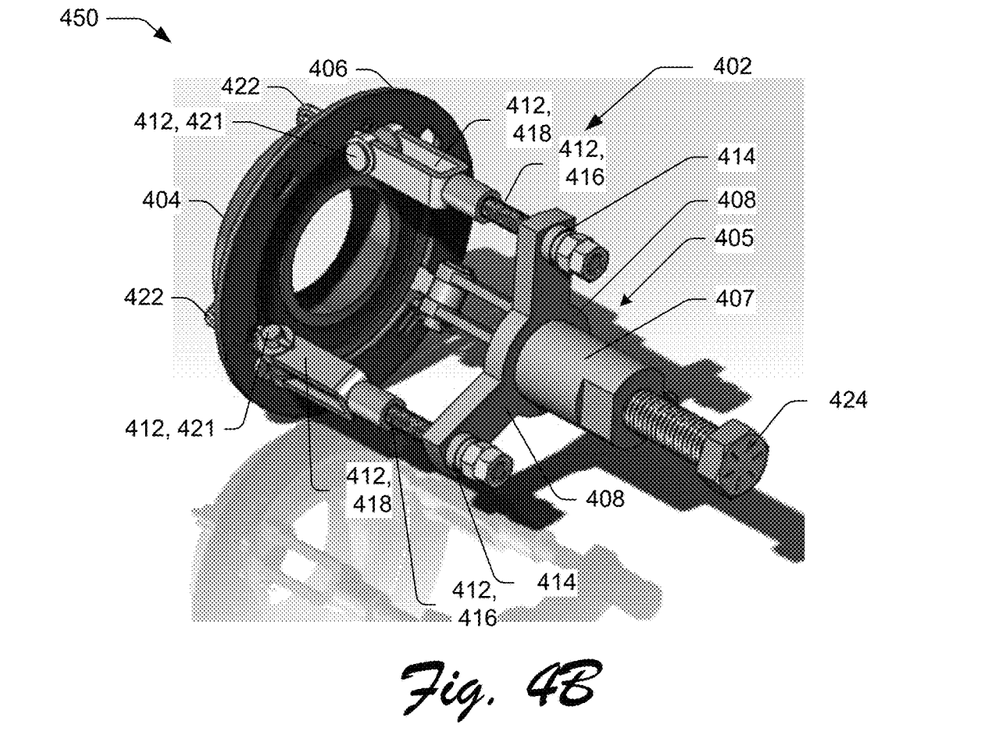

Referring to FIGS. 4A and 4B, there are shown a puller assembly or bearing tool 402 that is operable to employ the techniques described herein. FIG. 4A illustrates a front perspective view 400 of the bearing tool 402, and FIG. 4B illustrates a back perspective view 450 of the bearing tool. FIGS. 4A and 4B also depict a shaft bearing 404 and a bearing ring 406 as gripped by the bearing tool 402 to illustrate engagement of the shaft bearing by the bearing tool.

The bearing tool 402 has a base 405 including a hub portion 407 and a jaw support 408. The hub portion 407 is configured to slip over, or otherwise connect to, a shaft 202 (shown in FIG. 2) associated with the shaft bearing 404. For example, the hub portion 407 may include hub bore 410 to receive the shaft 202. A bearing jaw 412 is connected to the jaw support 408 at attachment points 414 of the jaw support. For some embodiments, the attachment points 414 may be positioned radially and equidistant from the hub portion 407.

The bearing jaw 412 includes threaded rods 416, devises 418, and keys 420. The threaded rods 416 attach to the attachment points 414 of the jaw support 408. Each threaded rod 416 may rotate at the corresponding attachment point 414 of the jaw support 408. For example, first and second nuts may be positioned adjacent to each other at an arm end of each threaded rod, in which the second nut is a jam nut connected to the jaw support 408 and the first nut rotates with the remainder of the threaded rod while supported by the second nut.

One end of each clevis 418 is coupled to a corresponding threaded rod 416 and another end of each devises 418 is coupled to a corresponding key 420 via a pin connection 421. The threaded rods 416 provide a first degree of movement in which each key 420 pivots relative to the jaw support 408. The devises 418 provide a second degree of movement different from the first degree of movement in which the keys 420 shift inward relative to the jaw support 408. Each key 420 has a hook end 422 and the first degree of movement of each threaded rod 416 pivots a direction of the hook end. The second degree of movement of the devises 418 draws, or otherwise moves, the keys 420 toward each other to engage an outer surface of a shaft bearing. The hub 406 includes a threaded bolt 424 that shifts the base 405 and the bearing jaw 412 relative to the shaft in response to rotating the threaded bolt 424.

Figure 5A:
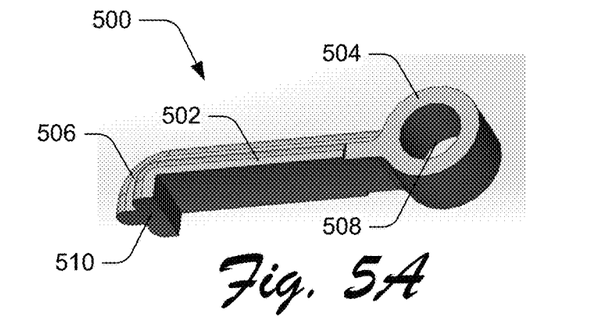
FIG. 5A is a perspective view of a key of the bearing tool of FIGS. 4A and 4B in an example implementation.

Referring to FIG. 5A, there is shown a key 500 of the bearing tool 402 in an example implementation. For simplicity of explaining the general operation of the bearing tool 402, FIGS. 5A-C (as well as subsequent FIGS. 6A, 6B, and 8A) focus solely on a single key of the bearing tool. However, it is be understood that the bearing tool 402 includes other components to manage the operation of the key and may include multiple keys to be operated in accordance with the techniques described herein.

Each key 500 of the bearing tool 402 includes an elongated body 502 having a head portion 504 that connects to the clevis 418. Referring to FIGS. 3B, 4A, and 4B in conjunction with FIG. 5A, the bearing tool 402 also includes a hook end 506 opposite the head portion 504 that may be inserted through a machined feature or support aperture 358 of the bearing support 354, along with part of the elongated body. The head portion 504 may include a pin bore 508 that may receive a cylindrical bar of the pin connection 421 at one end of the devises 418 for rotatable coupling to the clevis. The axis of rotation of the cylindrical bar of the clevis 418 is different from the axis of rotation of the threaded rod 416. For example, as shown in FIGS. 4A and 4B, the axis of rotation of the cylindrical bar may be orthogonal to the axis of rotation of the threaded rod 416. The hook end 506 may have a cross-sectional configuration 510 that matches, or may otherwise be inserted through the boundaries of the support aperture 358 of the bearing support 354.

Figure 5B:
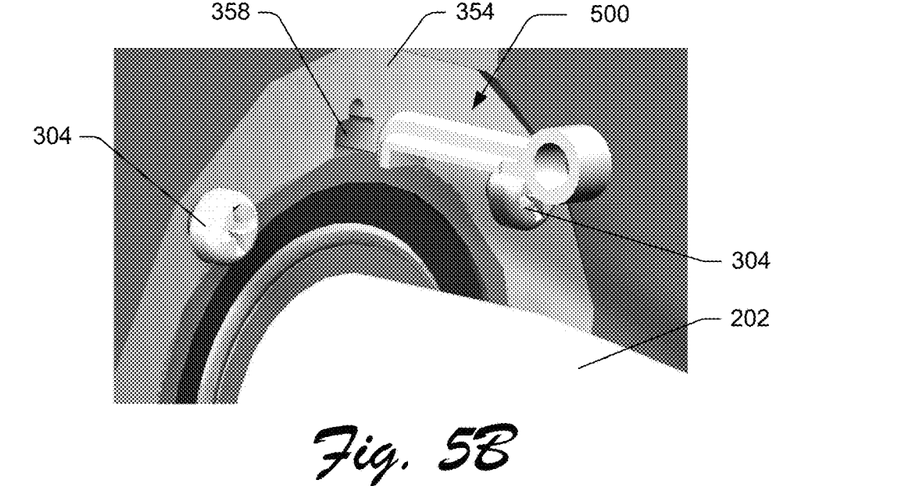
FIGS. 5B through 5C are side perspective views of the key of FIG. 5A interacting with the components associated with the main shaft of FIG. 3B.
Figure 5C:
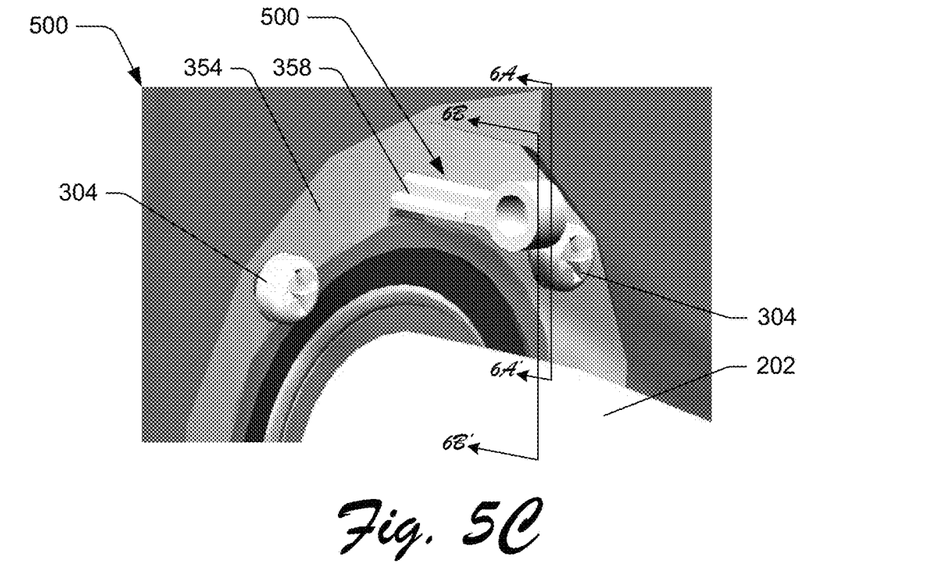

Referring to FIGS. 5B through 5C, there are shown the key 500 interacting with the components associated with the shaft. FIG. 5B illustrates the key 500 before insertion into the support aperture 358 in which the cross-sectional configuration 510 of the key aligns with the boundaries of the support aperture. FIG. 5C illustrates the key 500 inserted into the support aperture 358 and partially inserted through the bearing support 354. The hook end 506 of the key 500, thus the bearing tool 402, is able to pass through the support aperture 358 in the housing.

Figure 6A:
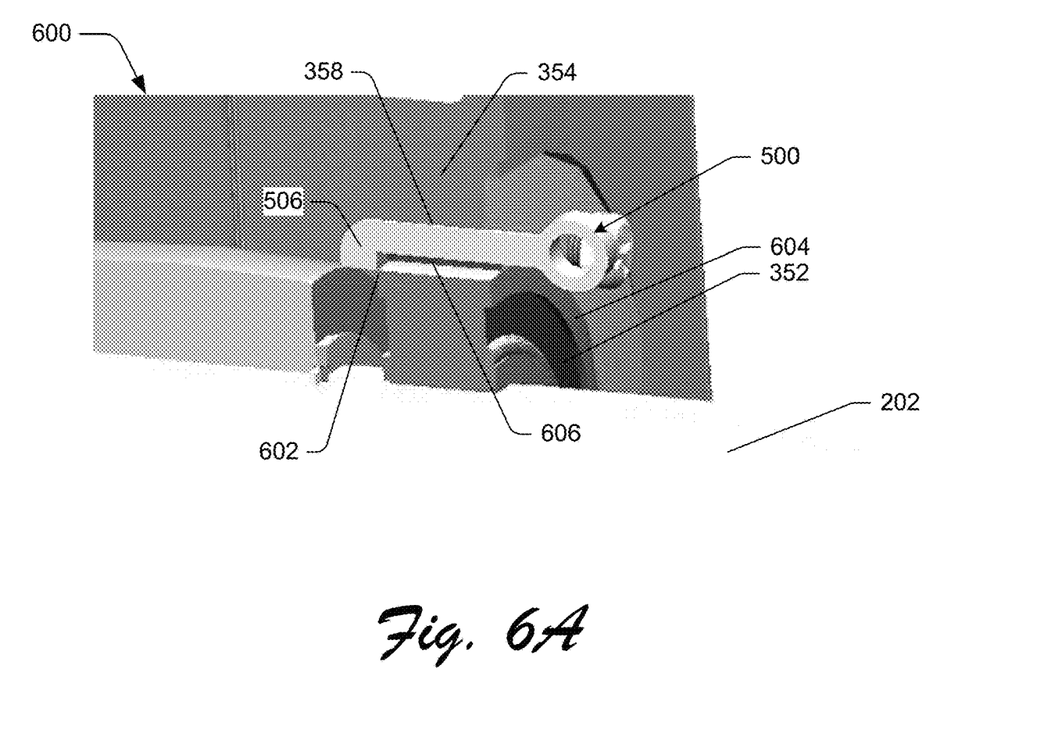
FIGS. 6A and 6B are cross-sectional views of the key and components associated with the main shaft of FIG. 5C, shown along lines 6A-6A' and 6B-6B' of FIG. 5C, respectively.
Figure 6B:
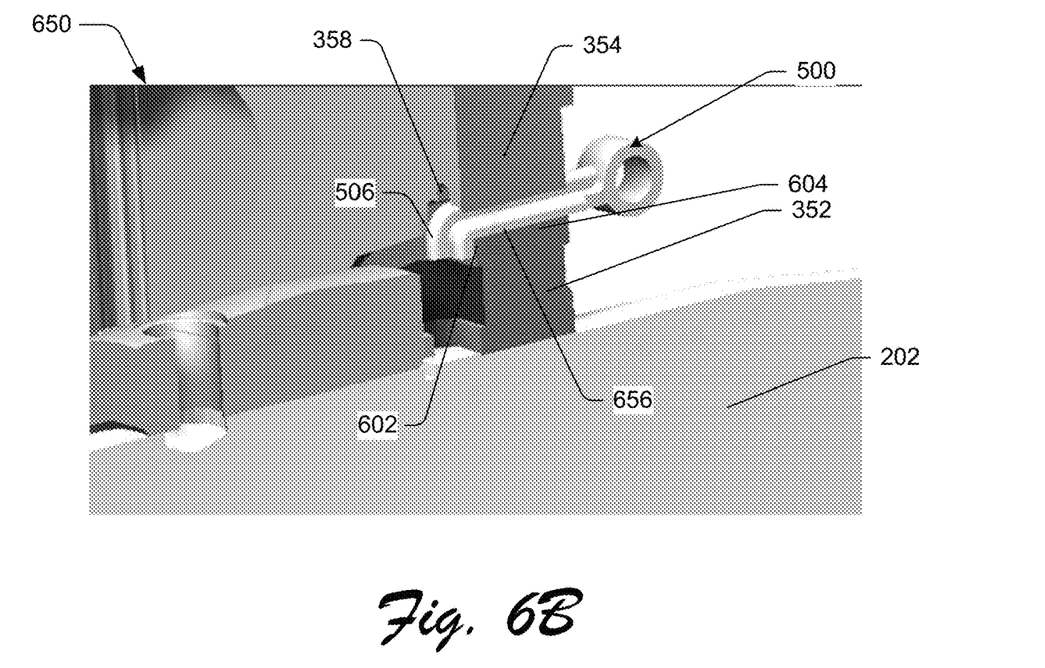

Referring to FIGS. 6A and 6B, there are shown cross-sectional views 600, 650 of the key 500 and components associated with the shaft. The hook end 506 may slide through the bearing ring 406 (shown in FIG. 4, not in FIGS. 6A-B) and a bearing support 354 past an edge 602 of the shaft bearing 352 as represented by the pre-drop view 600 of FIG. 6A. The hook end 506 may then drop down to engage with the outer race 604 of the shaft bearing as represented by the post-drop view 650 of FIG. 6B. The drop down change of position of the key 500, after sliding past the edge 602, is evident from the figures because a gap 606 between the key and the outer race 604 is shown in FIG. 6A and a non-gap 656 (i.e., lack of the gap 606) is shown in FIG. 6B. The bearing tool 402 is capable of engaging the shaft bearing 352 due, in part, by the fact that each key has a shape allowing insertion through the corresponding support aperture of the bearing support 354 as well as the corresponding ring aperture of the bearing ring.

Figure 7A:
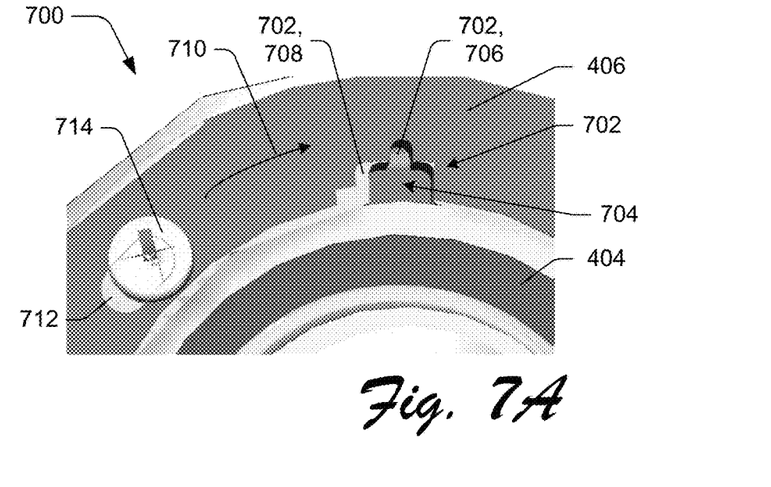
FIGS. 7A and 7B are partial close-up views of the end portion of the main shaft, and its associated components, of FIG. 3B.
Figure 7B:
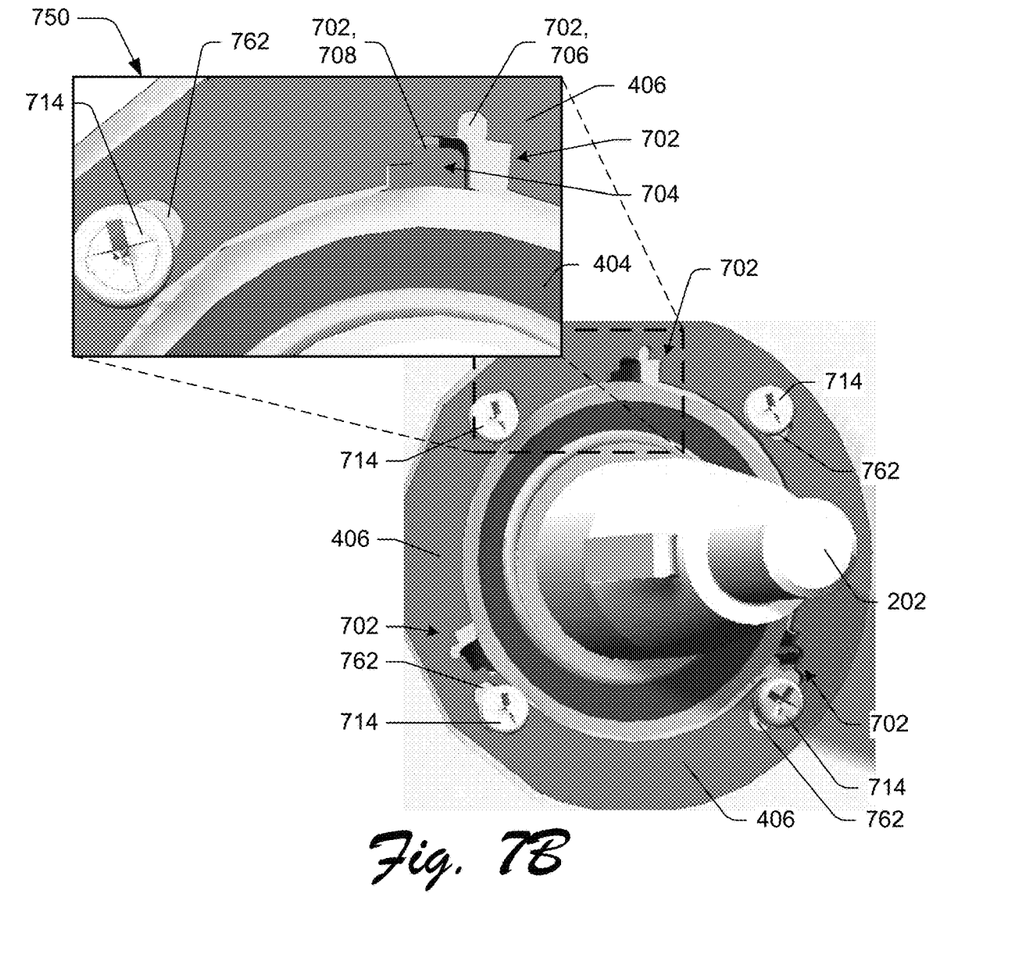

Referring to FIGS. 7A and 7B, there are shown multiple positions 700, 750 of a bearing ring 406 (as also represented in FIG. 4) and its associated components. In FIGS. 7A and 7B, the bearing tool 402 and components thereof, such as the keys 420, 500, are not shown with the bearing ring 406 for simplicity of explanation.

Referring to the FIG. 3 in conjunction with FIGS. 7A and 7B, the bearing ring 406 may be installed or retained where the bearing cover 302 was positioned with the original retaining screws or fasteners 304 (shown in FIG. 3). In particular, the bearing ring 406 is secured with the same fasteners 304 that held the bearing cover 302 to the bearing support 354 of the gate mechanism housing. When reattaching the fasteners 304 through the bearing ring 406 and to the bearing support 354, the fasteners are not fully tightened to allow some movement by the bearing ring 354 relative to the fasteners.

Referring specifically to FIG. 7A, the bearing ring 406 includes multiple ring apertures 702 and the bearing support 354 includes multiple support apertures 704. Each ring aperture 702 has a corresponding support aperture 704, and vice versa. Each ring aperture 702 has a shape similar to its corresponding support aperture 704 in that both apertures accommodate and allow insertion of a key therethrough. Each ring aperture 702 has a shape different from to its corresponding support aperture 704 in that the dimensions of each ring aperture is greater than the dimensions of the corresponding support aperture. Thus, the ring aperture 702 allows movement of a key within the ring aperture between a first position 706 and a second position 708 of the ring aperture, whereas the support aperture 704 generally conforms with the dimensions of the key's outer surface to limit motion within the support aperture.

In preparation for removal of the shaft bearing 404, each key is adjusted within the bearing ring 406 and the bearing support 354 based on a two-step process. FIG. 7A represents a first step of the process the bearing ring 406 and the bearing support 354. For this first step, the support aperture 704 is aligned with the first position 706 of the ring aperture 702 so that a key of the bearing tool may be inserted and passes through both apertures. As stated above, the bearing tool 402 shifts each key inward toward the shaft bearing 202. After each key is inserted and passed through the apertures 702, 704, the bearing ring 406 is rotated in a circular direction 710 relative to the keys and/or the bearing support 354 in order to secure the keys adjacent to the shaft bearing 404. It is to be note that the bearing ring 406 includes arcuate elongated apertures in which one side 712 of each aperture is exposed when a fastener 714 is positioned therethrough, thus allowing movement of the bearing ring 406 when rotated in the circular direction 710 (along with the lack of full tightening of the fasteners as noted above). For some embodiments, the ring aperture 702 may include a ramp that works in conjunction with the bearing tool 402 to shift the key inward toward the shaft bearing 404 as the bearing ring 406 is rotated in the circular direction 710.

FIG. 7B represents a second step of the process for the bearing ring 406 and the bearing support 354. For this second step, by rotating the bearing ring 406 in the circular direction 710, the support aperture 704 is aligned with the second position 708 of the ring aperture 702 so that the key of the bearing tool may be secured adjacent to the shaft bearing 404. The upper part of the second position 708, which is lower than the upper part of the first position 706, abuts the upper part of the key thus maintaining the key in this position against the shaft bearing 404. Each arcuate elongated aperture of the bearing ring 406 has another side 762 that is exposed from the head of each fastener 714 after the bearing ring 406 is rotated in the circular direction 710.

Figure 8A:
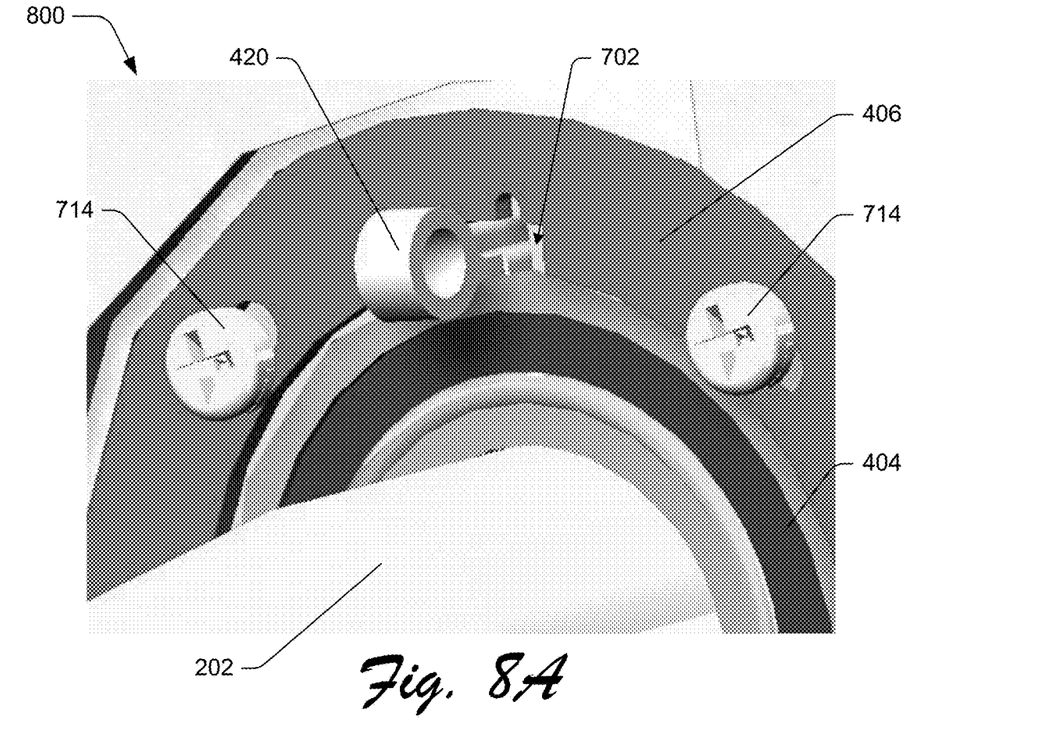
FIGS. 8A and 8B are partial close-up views illustrating an adjustment of the key of the bearing tool within the components associated with the shaft bearing and the main shaft.
Figure 8B:
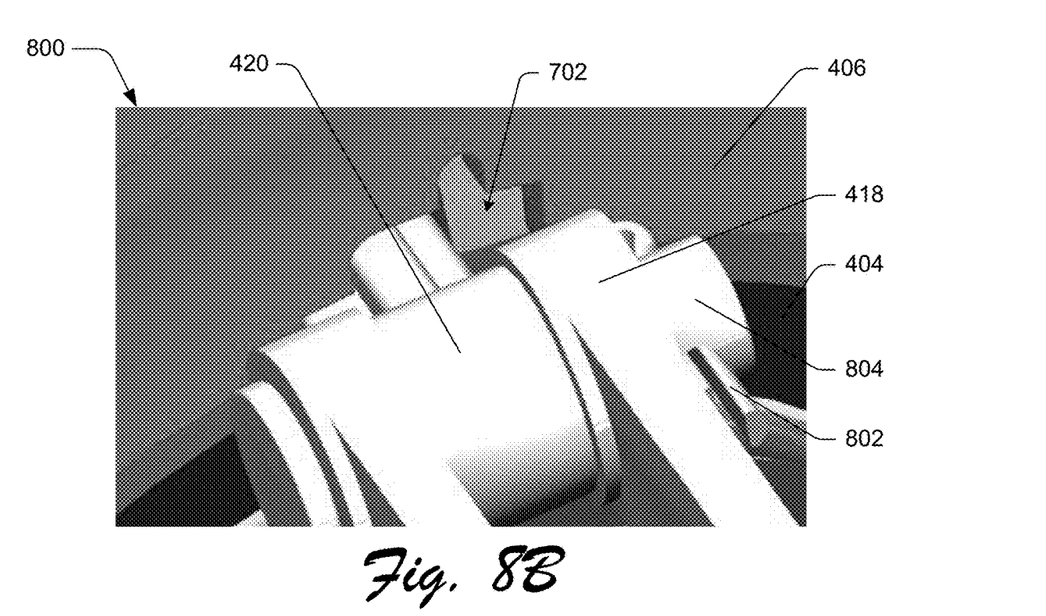

Referring to FIGS. 8A-B, in conjunction with FIGS. 4A-B, there are shown views illustrating an adjustment of each key 420 of the bearing tool 402 within the components associated with the shaft bearing 404 and the main shaft 202. For this example, the full opening of the support aperture 704 is exposed for the bearing jaw 412 to pass through the bearing ring 406 and the bearing tool 402 in the left most rotated position of the bearing ring. Once all the jaws have been inserted to the ring apertures 702 and support apertures 704, the bearing ring 406 is rotated to the right and tightened, as represented by FIGS. 8A-B. This closes the gap between the keys of the bearing jaws and the outer diameter of the shaft bearing 404, thus keeping the hook ends of the keys engaged to an outer race of the shaft bearing 404. The bearing jaw 412 further includes the pin connection 421 where, for some embodiments, the pin connection may include a pin 802 removably positioned through one end of a cylindrical bar 804 of the clevis 418.

Figure 9A:
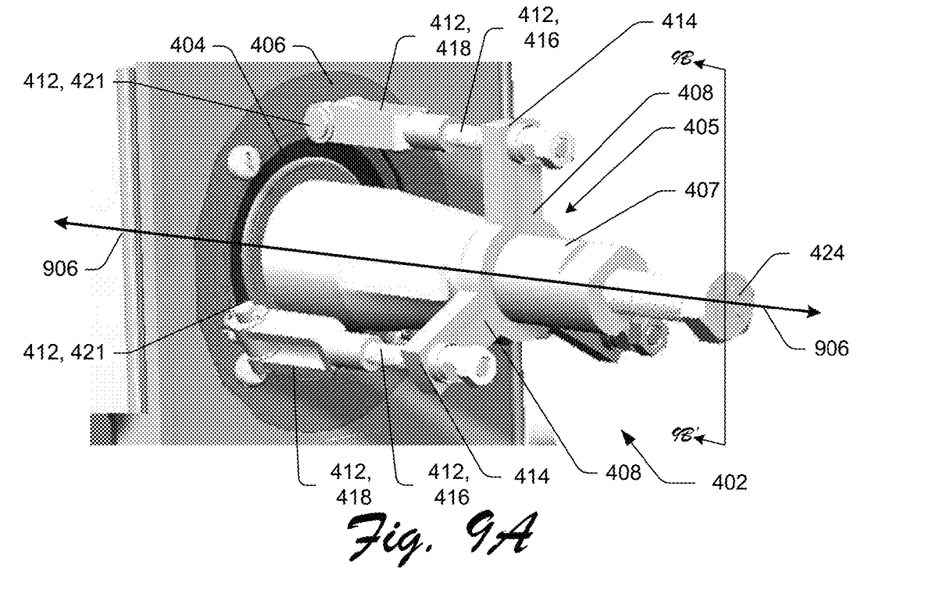
FIGS. 9A and 9B are perspective views of the bearing tool engaging the associated components of the shaft bearing and the main shaft, in which 9B is a cross-section shown along line 9B-9B' of FIG. 9A.
Figure 9B:
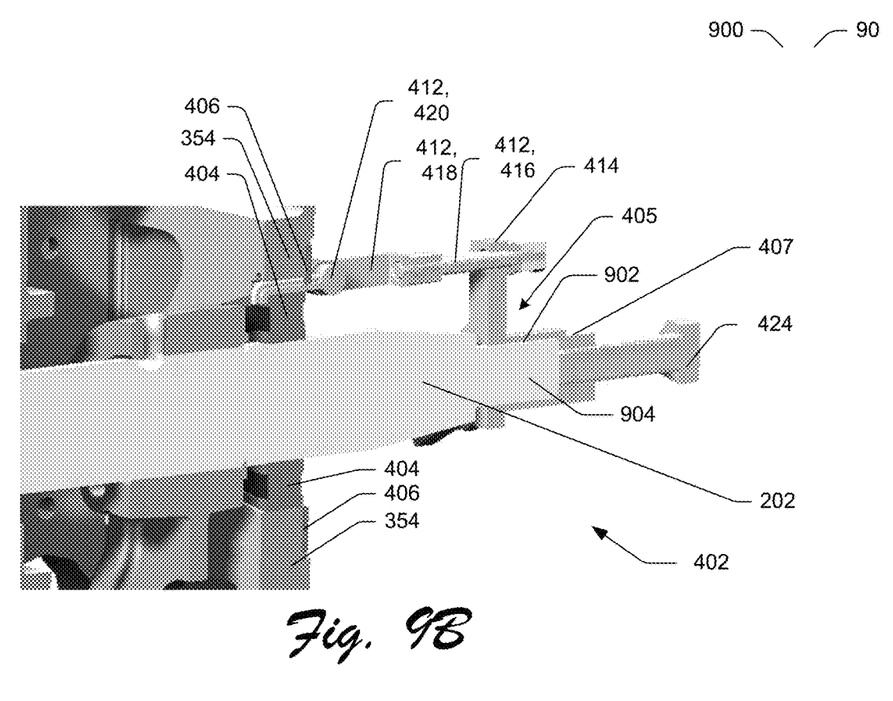

Referring to FIGS. 9A and 9B, there are shown the bearing tool 402 engaging the associated components of the shaft bearing 404 and the main shaft 202. The bearing tool 402 is installed on the main shaft 202 in which the hub portion 407 is supported by threads 902 at one end 904 of the main shaft. The hub portion 407 of the bearing tool 402 is offset from the keys 420, in which the hub portion is secured to a shaft, such as the main shaft 202, associated with the shaft bearing 404. The hub 406 of the bearing tool 402 is positioned along a central axis 906 relative to the keys 420.

Each stud or threaded rod 416 is allowed to pivot at an attachment point 414 of the base 405, and each clevis 418 gives each bearing jaw 412 its second degree of freedom to pass through the apertures of the bearing ring 406 and the bearing support 354 around the shaft bearing 404. The bearing jaws 412 of the bearing tool 402 then engage, such as collapsing and catching on, the outer diameter or dimensions of the shaft bearing 404. Next, the bearing ring 406 rotates to narrow the clearance around the bearing jaws 412 to keep them engaged to the outer surface of the shaft bearing 404. The threaded bolt 424 at the end of the hub portion 407 is then turned inwards, thus pulling the attached shaft bearing 404 until it is free of the crossing mechanism housing. Accordingly, the bearing tool 402 withdraws the shaft bearing 404 from the bearing support 354.

Once the shaft bearing 404 is free of the housing, the diameter of the shaft 202 may step down slightly and the shaft bearing may become loose on the shaft. The bearing tool 402 may be removed and a new bearing may slide along the shaft toward the housing. The shaft may be raised so that the outer diameter of the shaft bearing 404 slips into the housing, i.e., slip fit into the housing and slip fit on the shaft. The external parts of the gate mechanism 200 may be re-installed, the items external to the gate mechanism may be reattached to the shaft, and peripheral setup and external adjustment procedures may be applied (such as those applicable to support arms, counterweights, gate arm, conversion bracket, and the like.) Other components or devices, such as the segment gear 204, do not need to be removed and readjusted in the gate mechanism housing with this process.

Figure 10:
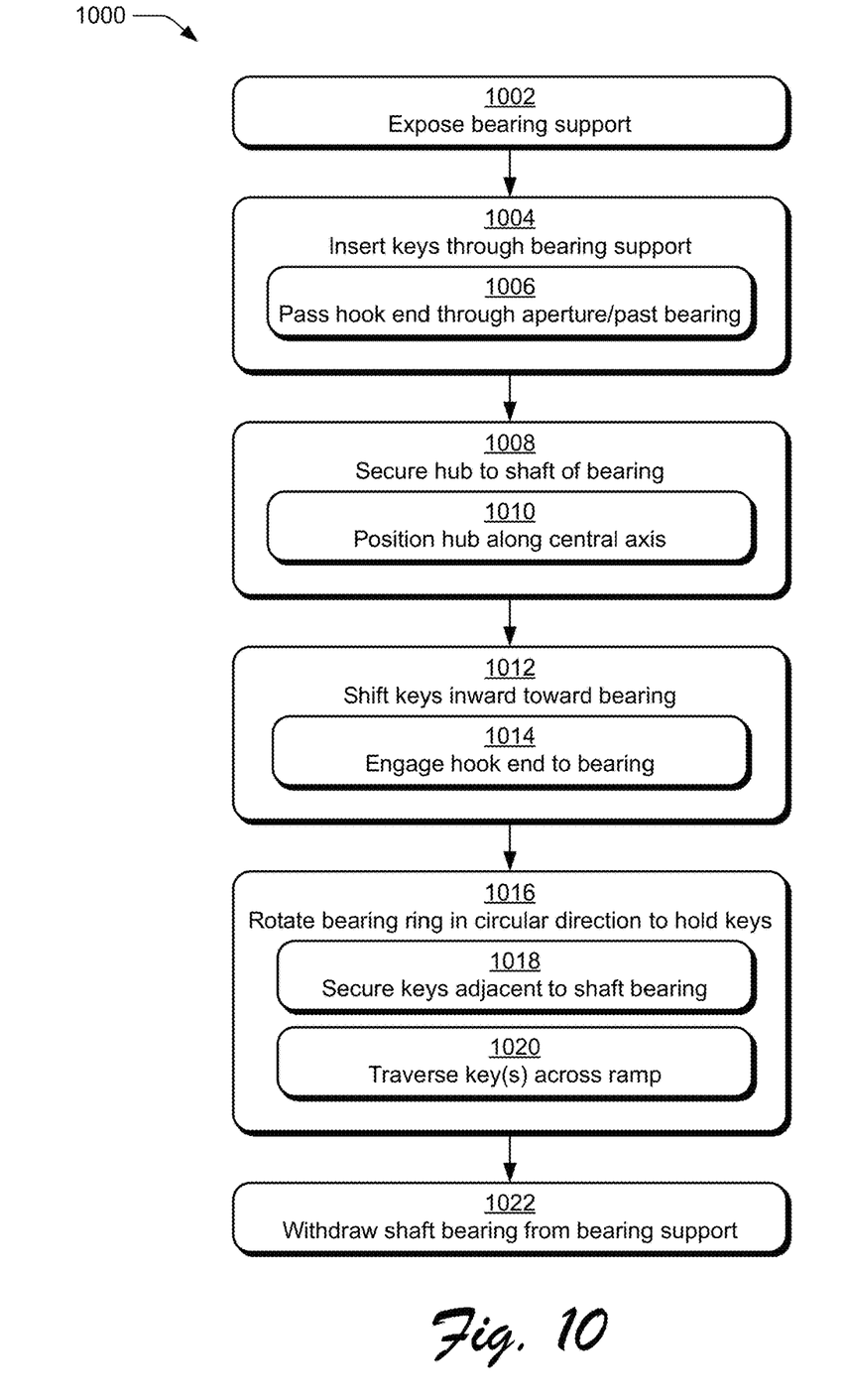
FIG. 10 is a flow diagram of an operation of the bearing tool in an example implementation that is operable to employ techniques described herein.

Referring to FIG. 10, in conjunction with FIGS. 3A through 9B, there is shown a flow diagram of an operation 1000 of the bearing tool 402 in an example implementation that is operable to employ techniques described herein. The example operation 100 provide removal of the bearing tool 402 from a bearing support 354 of a gate crossing mechanism 200. The bearing support 354, associated with the shaft bearing, is exposed of accessibility by the bearing jaws 412 of the bearing tool 402 (1002). For example, fasteners 304 may be removed from the bearing support 354 and a bearing cover 302 adjacent to the bearing support. The bearing cover 302 may then be displaced from the bearing support 354, and the fasteners 304 may be reattached to the bearing support 354.

After exposing the bearing support 354 (1002), the keys of the bearing tool 402 may be inserted through ring apertures 702 of a bearing ring 406 and support apertures 358 of the bearing support 354 (1004). For example, a hook end 422 of each key 420 may pass through the corresponding ring aperture 702, and the hook end may be inserted past an inner edge of the shaft bearing 404 (1006).

For some embodiments, a hub portion 407 of the bearing tool 402 may be positioned offset from the keys 420 and secured to a shaft, such as main shaft 202, associated with the shaft bearing 404 (1008). For example, the hub portion 407 may be positioned along a central axis 906 relative to the keys (1010). The bearing tool 402 may be secured to the shaft anytime before withdrawing the shaft bearing 404 from the bearing support 354, such as before or after inserting the keys through the bearing support (1004).

Each key 420 is shifted inward toward the shaft bearing 404 (1012) subsequent to inserting the keys through the bearing support 354 (1004). For some embodiments, each key 420 may be shifted so that the hook end 422 of each key engages to an outer race of the shaft bearing 404 (1014). After the keys 420 are shifted inward toward the shaft bearing 404 (1014), the bearing ring 406 is rotated in a circular direction 710 relative to the keys (1016). For some embodiments, as the bearing ring 406 is rotated in the circular direction 710, the bearing ring may secure the keys adjacent to the outer race of the shaft bearing 404 (1018). For some embodiments, the bearing ring 406 may include a ramp to adjust each key 420. As each key 420 traverses across the ramp of the bearing ring 406, the ramp operates in conjunction with the bearing tool 402 to shift the key inward toward the shaft bearing 404 as the bearing ring 406 is rotated in the circular direction 710. (1020). Thereafter, the shaft bearing 404 may be withdrawn from the bearing support 354 (1022).

Those skilled in the art will recognize that, for simplicity and clarity, the full structure and operation of all data processing systems suitable for use with the present disclosure are not being depicted or described herein. Also, none of the various features or processes described herein should be considered essential to any or all embodiments, except as described herein. Various features may be omitted or duplicated in various embodiments. Various processes described may be omitted, repeated, performed sequentially, concurrently, or in a different order. Various features and processes described herein can be combined in still other embodiments as may be described in the claims.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an example embodiment of the present disclosure has been described in detail, those skilled in the art will understand that various changes, substitutions, variations, and improvements disclosed herein may be made without departing from the spirit and scope of the disclosure in its broadest form.

What is claimed is:

1. An apparatus for removal of a shaft bearing from a gate crossing mechanism, the apparatus comprising:
   a bearing support of the gate crossing mechanism positioned about the shaft bearing, the bearing support including a plurality of support apertures;
   a bearing ring of the gate crossing mechanism including a plurality of ring apertures; and
   a bearing tool including a plurality of keys, each key of the plurality of keys having a shape allowing insertion through a ring aperture of the plurality of ring apertures and a support aperture of the plurality of support apertures, the bearing tool shifting each key of the plurality of keys inward toward the shaft bearing,
   wherein the bearing ring is rotated in a circular direction relative to the plurality of keys, and
   wherein the bearing tool withdraws the shaft bearing from the bearing support.

2. The apparatus as described in claim 1, further comprising a fastener management tool exposing the bearing support about the shaft bearing, wherein the fastener management tool removes fasteners from the bearing support and a bearing cover adjacent to the bearing support, and reattaching the fasteners through the bearing ring and to the bearing support subsequent to substituting the bearing ring in place of the bearing cover.

3. The apparatus as described in claim 1, wherein the bearing tool inserts each key by passing a hook end of each key through the support aperture and past an inner edge of the shaft bearing.

4. The apparatus as described in claim 3, wherein the bearing tool shifts each key by engaging the hook end of each key to an outer race of the shaft bearing.

5. The apparatus as described in claim 1, wherein the bearing tool includes a hub offset from the plurality of keys, the hub being secured to a shaft associated with the shaft bearing.

6. The apparatus as described in claim 4, wherein the hub of the bearing tool is positioned along a central axis relative to the plurality of keys.

7. The apparatus as described in claim 1, wherein the bearing tool rotates the plurality of keys to secure the plurality of keys at their inward positions adjacent to the shaft bearing.

8. The apparatus as described in claim 1, wherein the bearing tool traverses each key across a ramp of the bearing ring as the key is rotated in the circular direction.

\* \* \* \* \*